INVENTOR.
ALBERT F. GERLOVICH
BY MAHONEY, HALBERT &
HORNBAKER
ATTORNEYS

Dec. 3, 1968     A. F. GERLOVICH     3,414,425
METHOD FOR APPLYING A PARTICULATE MATERIAL TO A BODY
Filed Sept. 14, 1964     2 Sheets-Sheet 2
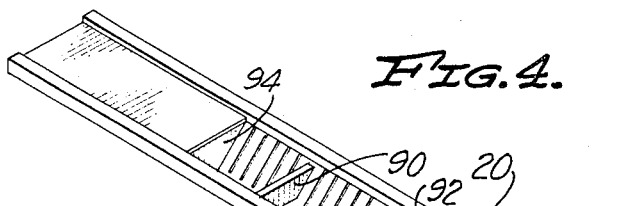
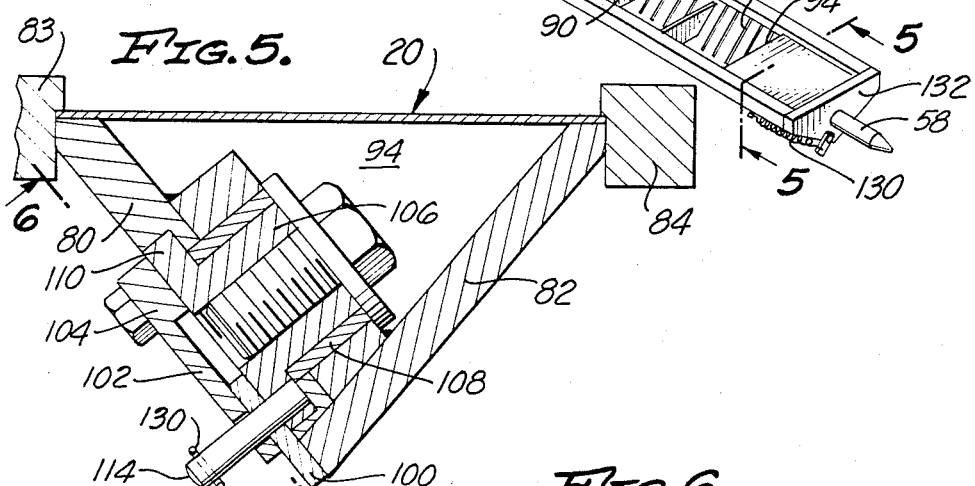
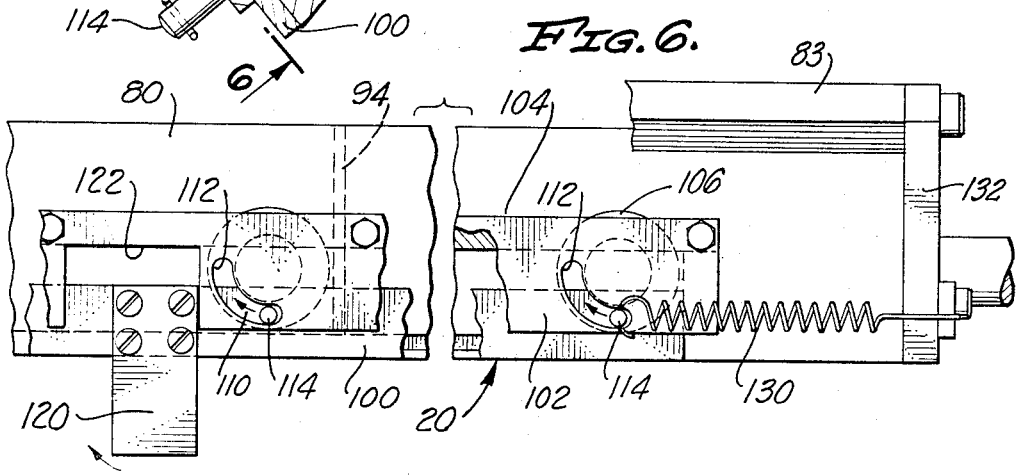
INVENTOR.
ALBERT F. GERLOVICH
BY
MAHONEY, HALBERT &
HORNBAKER
ATTORNEYS

United States Patent Office 3,414,425
Patented Dec. 3, 1968

3,414,425
METHOD FOR APPLYING A PARTICULATE MATERIAL TO A BODY
Albert F. Gerlovich, Fanwood, N.J., assignor to Rheem Manufacturing Company, New York, N.Y., a corporation of California
Filed Sept. 14, 1964, Ser. No. 396,124
6 Claims. (Cl. 117—18)

ABSTRACT OF THE DISCLOSURE

A method is described for applying a particulate material such as a polyethylene to the inner surface of a drum. The drum is supported on its side for rotation about its longitudinal axis, and a heater is disposed above it for maintaining it at a predetermined temperature. An elongated trough positioned adjacent an open end of the drum is filled with a predetermined amount of the particulate material. The drum is rotated and as it rotates, the elongated trough is extended longitudinally into the drum through its open end. The particulate material is discharged in a curtain from an elongated slotted opening in the trough so that the inner surface of the rotating drum becomes uniformly coated with the material.

---

This invention relates to a method and apparatus for applying a particulate material to a body for the purpose of forming a substantially uniform coating on the body. More particularly, this invention relates to a method and apparatus for applying a particulate material, such as a powdered resin or a metallic powder, so as to form a coating on the interior surface of a cylindrical body, such as the interior surface of a metal shipping container.

Metal shipping containers, such as black steel drums and pails, are used extensively for transporting and storing a wide variety of products, but their effective use can be greatly extended if the inside of such containers is coated with a material resistant to corrosive activities and reactions of products which cannot now be carried and stored in such drums because of such product activities and reactions. By way of example, presently it is not possible or practical to pack products with high acid activity qualities in black steel drums, and often excessively expensive drums, such as stainless steel drums, are used for such purpose. The application of the method and apparatus of the present invention to black steel drums will product coated black steel drums at a cost far below the cost of stainless steel drums, and such coated drums will have corrosive-resistant characteristics commercially comparable, and often superior, to those of substantially more expensive drums, such as stainless steel drums.

Various corrosive-resistant coatings have been applied to drums by many methods, such as painting or dipping, in order to build up the corrosive-resistant capacities of drums and pails, but many limitations have been encountered. For instance, several of the coating materials are relatively expensive. But more important are the considerations that such coatings are often inefficient in that they leave voids created by air bubbles or give an incomplete coverage of the entire interior surfaces of the drums to which they are applied; the coatings formed thereby are excessively thin; they often become brittle and break away from the drum body; and it is generally impossible or impractical to build up sufficiently dense coatings by repeated applications of layers of coatings.

To overcome these coating deficiencies, more recently it has been found advantageous to apply particulate materials to the interior surfaces of heated drum bodies, and it has been found that such application, if carefully conducted, produces a firm bond between the coating material and the surface of the body of a drum, and that the coating renders the drum body corrosive-resistant. Various methods and apparatuses have been devised for applying such particulate material coatings to drum bodies, but often they are elaborate and do not adapt themselves for ready installation as a part of a modern, high-speed drum production line.

It is, therefore, an object of this invention to provide a method and apparatus for applying a resinous or metallic powder to the interior surface of a cylindrical body, such as a drum body, to form a solid, complete, corrosive-resistant coating on said surface.

It is a further object of the invention to provide such a method and apparatus which render it commercially feasible to apply quickly, easily, and relatively inexpensively, a single, firm, solid, and complete coating of corrosive-resistant material to the inside surface of a body, such as the body of a black steel shipping container, which coating is free of voids.

It is still a further object of the invention to provide such a method and apparatus which will permit the application of the coating in a single coating operation.

It is another object of the invention to provide such a method and apparatus which are relatively simple and readily adaptable to take their places in a modern, high-speed steel container production line without causing undue production delays.

With these and other objects in view, the invention consists of the various steps of the method, and the construction, arrangement, and combination of the various parts of the apparatus, whereby the objects contemplated are attained, as hereinafter set forth, pointed out in the appended claims, and illustrated in the accompanying drawings, in which:

FIG. 4 is an isometric view of the trough element of the present invention;

FIG. 5 is an enlarged cross-sectional view taken on line 5—5 of FIG. 4; and

FIG. 6 is a reduced fragmentary view, partially broken away, and taken on line 6—6 of FIG. 5.

Figure 1:
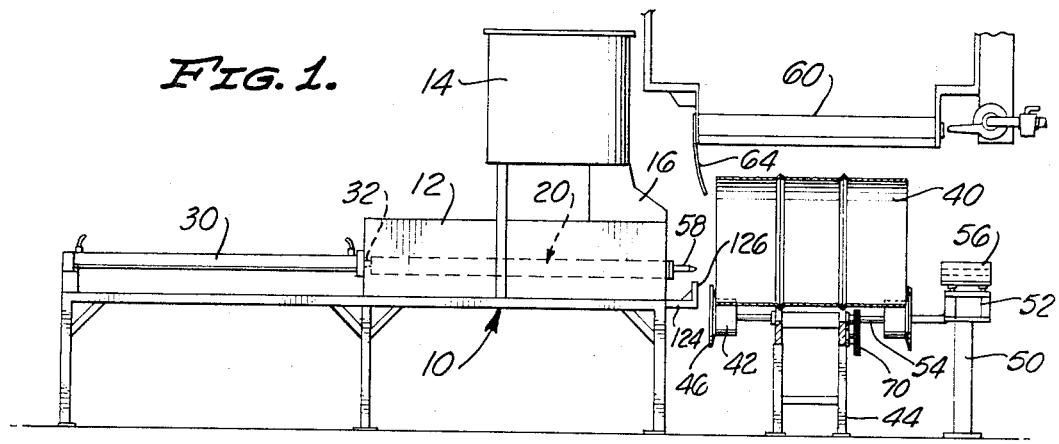
FIG. 1 is a side elevational view of the apparatus of the present invention showing the trough element retracted from the body to be coated.

As shown in FIG. 1 of the drawings, a bench 10 has an elongate bin 12 mounted thereon adjacent one end of the bench 10. Mounted on the bench 10 above the bin 12 is a hopper 14 disposed so as to receive and hold a quantity of particulate material, such as powdered resin or metallic powder, and discharge said particulate material into the bin 12 by means of a discharge chute 16.

Longitudinally, slidably disposed in the bin 12 is an elongate trough 20, best illustrated in FIG. 4, hereinafter described in detail.

A reciprocating fluid cylinder 30 is mounted on the bench 10 laterally of the bin 12 and supported on one end of the bin 12, and a piston rod 32 is disposed in the cylinder 30 and protrudes from the cylinder 30 into the bin 12 in axial alignment with the trough 20, on which the free end of the piston rod 32 is mounted.

Figure 3:
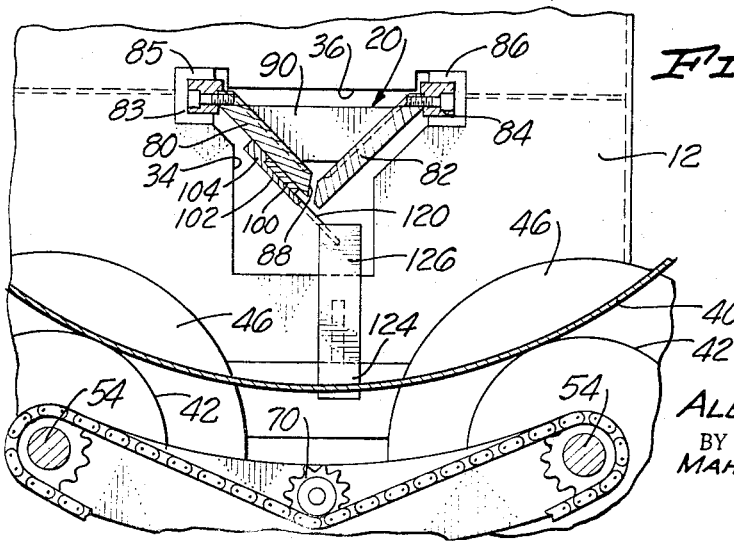
FIG. 3 is a further enlarged cross-sectional view taken on line 3—3 of FIG. 2.

At the other end of the bin 12 there is an opening 34, shown in FIG. 3, the opening 34 being disposed so as to slidably receive the trough 20 so that, when fluid pressure is introduced into the cylinder 30 in one direction, the piston rod 32 will extend so as to move the trough 20 laterally in the bin 12 through the opening 34 and extend the trough 20 externally of the bin 12, and when fluid pressure is introduced into the cylinder 30 in the opposite direction, the piston rod 32 will retract into the cylinder 30 so as to move the trough 20 in the opposite direction and restore it to its position within the bin 12. The vertically disposed top 36 of the opening 34 serves as a leveler which removes excess particulate material from the trough 20 as the trough 20 passes therethrough as it is extended, so that the quantity of particulate material in the trough 20 as it is extended into a drum, hereinafter described, is pre-determined.

Figure 2:
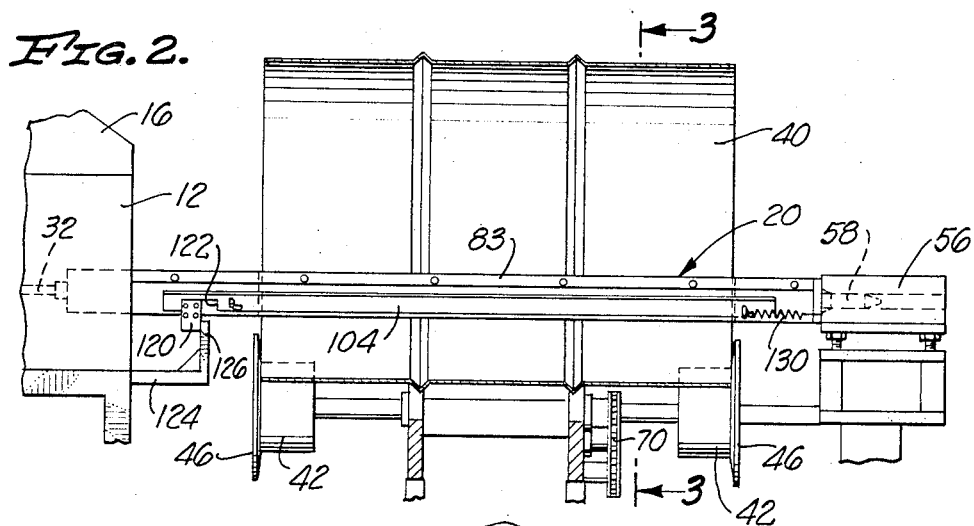
FIG. 2 is an enlarged fragmentary view of a portion of the apparatus showing the trough element extended into the body to be coated.

FIGS. 1–2 illustrate an open-ended drum 40, the interior surface of which is to be coated. The drum 40 is supported on rollers 42 rotatably mounted on a stand 44. The stand 44 is positioned laterally of the bench 10, adjacent to the end of the bench 10 on which the bin 12 is mounted, and the position and height of the stand 44 and the rollers 42 mounted thereon is such that, when the trough 20 is extended, as hereinabove described, the trough 20 will be disposed within the drum 40 parallel to the cylindrical or longitudinal axis of the drum 40 and spaced apart from the interior surface of the drum 40.

The rollers 42 have vertically disposed disc plates 46 mounted on their outer ends, the purpose of the plates 46 being to retain the drum 40 on the rollers 42 during the coating operation, hereinafter described.

A second stand 50 is disposed laterally of the stand 44 and supports a bearing box 52 for a shaft 54 on which the rollers 42 are mounted, and the stand 50 also supports a vibrator, such as a magnetic vibrator 56, which is disposed so that it will slidably receive and act as a support for a spur 58 mounted on the free end of the trough 20 when the trough 20 is extended by the action of the piston rod 32, and will vibrate the trough 20 so as to aid in the discharge of particulate material in a substantially even curtain, as hereinafter described.

Mounted in suspended position over the drum 40 is a heater 60, such as an infra-red heater, having a reflector 64 directed toward the inside of the drum 40 so that during the coating operation the temperature of the body of the drum 40, which is pre-heated before the coating operation is undertaken, will be kept within a satisfactory heat range.

During the coating operation the drum 40 is rotated as hereinafter explained, and rotation of the drum is accomplished by rotation of the shaft 54 on which the rollers 42 are mounted. The shaft 54 may be rotated by any suitable means, such as the powered chain and sprocket drive 70 shown in FIGS. 1–3 of the drawings.

The trough 20 is of triangular configuration and has side members 80 and 82 which converge downwardly toward each other from glide members 83 and 84, respectively, said glide members 83 and 84 being slidably disposed in parallel tracks 85 and 86, respectively, longitudinally disposed in the bin 12 and aligned with the opening 34 in the bin 12 so as to slidably support the trough 20. The bottom edges of the side members 80 and 82 are spaced apart from each other, the side member 80 being shorter than the side member 82, and the bottom edges are beveled, so as to define a longitudinally disposed slotted opening 88 in the bottom of the trough 20, as best illustrated in FIG. 3 of the drawings.

As shown in FIG. 4 of the drawings, parallel transverse divider panels 90, spaced apart from each other, are mounted in the trough 20 so as to aid in the even distribution of particulate material deposited in the trough 20, and the side members 80 and 82 may have grooves 92 formed on their interior surfaces and disposed so as to direct particulate material in the trough 20 toward the slotted opening 88. Blocks 94 are disposed within the trough 20 at its ends.

Disposed externally on the side member 80 adjacent the slotted opening 88 is an elongate gate 100 which serves to open and close the slotted opening 88. The gate 100 is slidably disposed in a slotted opening defined by the side member 80 and a step 102 in an elongate plate 104 mounted on the side member 80.

A hub 106 and hub bearings 108, best shown in FIG. 5, are disposed in each of the blocks 94 and the side member 80, the hubs 106 having outwardly directed flanges 110. Upwardly directed arcuate slotted openings 112 are formed in the plate 104 in alignment with the hubs 106, and pins 114 are mounted on the flanges 110 of the hubs 106 and extend through tight bores in the gate 100 into the arcuate openings 112 from which they protrude.

Mounted on the gate 100 adjacent to but spaced apart from the inner end of the trough 20 and depending from the gate 100 is a striker plate 120. The elongate plate 104 is cut away, as at 122, shown in FIGS. 2 and 6, to accommodate the striker plate 120.

A bracket 124 is mounted on the bench 10 and disposed below the opening 34 in the bin 12, the bracket 124 having an upwardly extending arm 126 which is positioned so as to intercept the striker plate 120 when the trough 20 is extended.

A tension spring 130 is mounted on the lower end of an end plate 132 on the protruding end of the trough 20 and on the forwardly disposed pin 114.

In operation, the trough 20 is fully retracted into the bin 12 by the action of the assembly of the reciprocal cylinder 30 and piston rod 32, the gate 100 on the trough 20 being in its downward position to close the slotted opening 88 at the bottom of the trough 20, and the hopper 14 is charged with particulate material which flows through the discharge chute 16 into the bin 12 filling the trough 20.

Meanwhile, the drum 40 is pre-heated in an oven (not shown). In pre-heating of the drum 40, it has been found advantageous to bring the drum to a metal temperature of approximately 450° Fahrenheit and to maintain that temperature for approximately three minutes, although the suggested temperature and residence time in the drum may vary, according to the gauge of the steel in the drum body and other conditions, so that the temperature and residence time are given as illustrations, and are not intended as limitations. The pre-heated drum 40 is then removed from the oven and placed on the rollers 42.

The cylinder 30 is then activated by fluid pressure, and the piston rod 32 extends so as to project the filled trough 20 from the bin 12 and into the drum 40 until the spur 58 is lodged in the vibrator 56. It will thus be seen that for the balance of the coating operation, the trough 20 will be disposed within the drum 40 parallel to the longitudinal axis of the drum 40, and in position to discharge the particulate material contained in the trough 20 by gravity, aided by the vibrator 56, in a curtain, as hereinafter described.

As the trough 20 becomes positioned within the preheated drum 40, the rollers 42 are rotated so as to rotate the drum 40, and it has been found that if the drum 40 is a standard fifty-five gallon drum and the particulate material is polyethylene resin, satisfactory coating results are obtained if the drum 40 is completely rotated ten times during the coating operation at a modest speed, although the number of revolutions of the drum 40 may vary according to the particulate material used and other factors, so that the number of revolutions specified are given by way of example, and are not intended to be limiting.

As the drum 40 revolves, the heater 60 is activated, and heat is directed into the drum 40 to assist in maintaining the body temperature of the drum 40 at a high level during the coating operation.

Just prior to the full extension of the trough 20 to the full seating of the spur 58 in the vibrator 56, the striker plate 120 on the gate 100 strikes the arm 126 of the bracket 124 and interrupts the free lateral movement of the gate 100 with the trough 20. As the trough 20 continues its lateral movement toward its final seated position, the pins 114 ride arcuately upwardly in the arcuate slots 112, and thus carry the gate 100 upwardly, against the biasing action of the sping 130, so as to open the slotted opening 88 in the trough 20.

The pre-determined amount of particulate material in the trough 20, as determined by the leveler 36, then drops by gravity, aided by the action of the vibrator 56, through the slotted opening 88 and falls in a curtain on the inner surface of the revolving, heated drum 40, so that there is a substantially even coverage of the particulate material over the entire inner surface of the drum 40. Thus, a substantially even coating, free of voids, is formed on the drum 40 by the fusion and adhesion of the particulate material.

When the coating operation is completed, the reciprocating cylinder 30 is activated to retract the trough 20 and restore it to its initial position within the bin 12, whereupon the trough 20 is again filled with particulate material for the start of the next coating operation.

As the retraction of the trough 20 gets under way, the striker plate 120 moves away from the arm 126 of the bracket 124, and the spring 130 is then free to act on the pin 114 on which it is mounted so as to move the pins 114 downwardly in the arcuate slots 112. The gate 100 is thus moved downwardly to close the slotted opening 88 as the trough 20 proceeds through the opening 34 in the bin 12, so that when the trough 20 is positioned within the bin 12, it is closed to retain another pre-determined load of particulate material deposited therein for the next coating operation.

After the trough 20 is retracted, the drum 40 is removed from the rollers 42, and another pre-heated drum 40 is placed on the rollers 42 for the next coating operation.

If desired, after removal from the rollers 42 at the completion of the coating operation, the drum 40 may be post-heated in an oven (not shown) at a suggested temperature of 390° Fahrenheit for a period of approximately fourteen minutes, although post-heating, and temperature and time of post-heating, are not to be considered to be limiting.

I claim:

1. The method of applying a fusible particulate material to the inner surface of an open-ended, heated cylindrical body which comprises the steps of: disposing said body on its side with its cylindrical axis generally horizontal; applying heat to said body to maintain same at a predetermined temperature; disposing a pre-determined quantity of particulate material in an elongated trough positioned adjacent an open end of and outside said body and having a substantially triangulate cross-section with a closed longitudinally disposed slotted opening adjacent the apex of the trough; spreading said material uniformly along the length of said trough; rotating the body substantially only about its axis; introducing the trough into the rotating heated body through said open end, with the apex of the trough disposed downwardly; thereafter freeing the slotted opening of said trough; and discharging the particulate material by gravity from said trough through said opening in an axially uniform curtain extending substantially the entire axial length of the body so as to deposit and adhere the particulate material substantially uniformly over the entire inner surface of the body.

2. The method of claim 1, including the further step of agitating said trough during the discharge of said particulate material to aid in said discharge.

3. The method of claim 1, wherein the step of heating the drum is conducted at approximately 450° Fahrenheit for a period of approximately three minutes.

4. The method of claim 1, wherein the step of rotating the body is conducted for approximately ten full revolutions of the body.

5. The method of claim 1, including the steps of: removing the trough from the body; and post-heating the body.

6. The method of claim 5, wherein the step of post-heating is conducted at approximately 390° Fahrenheit for a period of approximately fourteen minutes.

References Cited

UNITED STATES PATENTS

| 2,737,461 | 3/1956 | Heisler et al. | 117—18 |
| 3,056,692 | 10/1962 | Kitada | 118—318 |
| 3,230,105 | 1/1966 | Spraul et al. | 117—18 |
| 3,303,141 | 2/1967 | Thompson | 117—18 |
| 2,964,419 | 12/1960 | Link et al. | 118—308 X |
| 3,011,914 | 12/1961 | Pflug | 118—69 X |
| 3,061,154 | 10/1962 | Lindquist | 118—308 X |
| 3,132,967 | 5/1964 | Spraul et al. | 118—308 X |

WILLIAM D. MARTIN, *Primary Examiner.*

P. F. ATTAGUILE, *Assistant Examiner.*